(12) United States Patent
Niebojewski (10) Patent No.: US 12,475,395 B2
(45) Date of Patent: Nov. 18, 2025

(54) QUANTUM DEVICE INTEGRATING A BURIED METAL ELECTRODE

(71) Applicant: COMMISSARIAT A L'ENERGIE ATOMIQUE ET AUX ENERGIES ALTERNATIVES, Paris (FR)

(72) Inventor: Heimanu Niebojewski, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 645 days.

(21) Appl. No.: 17/897,266

(22) Filed: Aug. 29, 2022

(65) Prior Publication Data

US 2023/0063360 A1 Mar. 2, 2023

(30) Foreign Application Priority Data

Aug. 31, 2021 (FR) ...................................... 21 09068

(51) Int. Cl.
  *G06N 10/40* (2022.01)
  *H10N 60/20* (2023.01)

(52) U.S. Cl.
  CPC ............. *G06N 10/40* (2022.01); *H10N 60/20* (2023.02)

(58) Field of Classification Search
  USPC .......................................... 320/100; 716/100
  See application file for complete search history.

(56) References Cited

U.S. PATENT DOCUMENTS

| | | |
|---|---|---|
| 10,381,468 B2 | 8/2019 | Cheng et al. |
| 2016/0300155 A1 | 10/2016 | Betz et al. |
| 2018/0277669 A1 | 9/2018 | Cheng et al. |

(Continued)

FOREIGN PATENT DOCUMENTS

EP 2 075 745 A1 7/2009

OTHER PUBLICATIONS

French preliminary Search Report issued May 10, 2022 in French Application 21 09068 filed on Aug. 31, 2021, 12 pages (with English Translation of Categories of Cited Documents & Written Opinion).

(Continued)

*Primary Examiner* — Brian Ngo
(74) *Attorney, Agent, or Firm* — Oblon, McClelland, Maier & Neustadt, L.L.P.

(57) ABSTRACT

A Qbit spin quantum device includes juxtaposed first and second semiconducting portions, the semiconducting portions being formed in a surface layer of a semiconductor-on-insulator type substrate and disposed on an insulating layer of the substrate, the substrate being fitted with a semiconducting support layer such that the insulating layer is arranged between the support layer and the surface layer, and several pairs of front control gates, each pair being formed respectively of first and second front control gates covering a region of the first and second semiconducting portions to form first and second quantum islands, respectively. An insulating region is provided between the first and second quantal islands to enable electrostatic coupling between the first and second quantum islands. The quantum device includes a back conductive electrode vertically aligned with a coupling insulating region and being formed of a region of metal-semiconductor material alloy arranged in the support layer.

15 Claims, 9 Drawing Sheets

(56) References Cited

U.S. PATENT DOCUMENTS

2019/0043968 A1\* 2/2019 Lampert .............. G06N 10/40
2019/0123183 A1\* 4/2019 Hutin ................. H01L 21/2652
2019/0189790 A1  6/2019 Cheng et al.
2020/0127096 A1  4/2020 Eendebak et al.

OTHER PUBLICATIONS

Kanne et al., "Double nanowires for hybrid quantum devices", arxiv.org, Mar. 25, 2021, 22 pages.
Hutin et al., "SOI CMOS Technology for Quantum Information Processing: A path towards quantum bits and control electronics co-integration", 2017 IEEE International Conference on IC Design and Technology (ICICDT), 2017, 4 pages.

\* cited by examiner

QUANTUM DEVICE INTEGRATING A BURIED METAL ELECTRODE

TECHNICAL FIELD

The present application relates to the field of quantum electronic devices and in particular that of making a quantum device with quantum bits (also called Qubits) formed of semiconducting islands and using, in addition to front gate electrodes located above the islands, a back control electrode arranged below the level in which the islands are located.

PRIOR ART

Quantum islands (sometimes also referred to as quantum boxes or quantum dots) form basic elements of a quantum electronic device. Quantum islands are typically formed in a layer of semiconductor material in which potential wells are implemented to confine carriers, electrons or holes, in three dimensions of space. Quantum information is then encoded via the spin of the carrier. These are known as spin Qubits.

According to one approach, electrons are confined by field effect below gate electrodes similar to those of transistor structures and information is encoded in the spin of these electrons. These so-called "front" gates are arranged above the set of quantum islands. For some applications, a back electrostatic control is used in order to better modulate the electrostatic environment of the quantum islands. Such control is typically achieved via an additional electrode thus located below the set of quantum islands.

This type of quantum device generally operates at very low temperatures, which means that if the back gate is to be made of semiconductor material, the latter should be heavily doped so that the gate can remain conductive and functional.

However, doping a substrate very heavily by ion implantation raises the risk of inducing residual dopants in the semiconducting layer in which the islands are provided. This is not compatible with the proper operation of a quantum device.

Another method which would include a wafer transfer step with a zone already doped to make the back gate would have the disadvantage of being complex to implement and of inducing a significant method variability.

The same applies to a method which would consist in making the back gate by structuring the back face of a substrate, for example by forming a conductive via passing through the back face of this substrate on which the islands are provided.

Furthermore, for some applications, quantum devices provide an additional conductive line through which an RF signal is passed in order to manipulate the electron spin. Such a conductive line should preferably be located as close as possible to the semiconducting islands. It is thus known to juxtapose this line next to the semiconducting islands, or to dispose such a line above the islands, for example in a first metal level.

However, such arrangements raise a problem of overall size.

DISCLOSURE OF THE INVENTION

According to one aspect, the present invention relates to a spin qubit quantum device, including:
  a first semiconducting portion and a second semiconducting portion juxtaposed to the first semiconducting portion, said semiconducting portions being formed in a surface layer of a semiconductor-on-insulator type substrate and disposed on an insulating layer of said semiconductor-on-insulator type substrate, the substrate being fitted with a semiconducting support layer such that said insulating layer is arranged between said support layer and said surface layer,
  several pairs of front control gates, each pair being formed respectively of a first front control gate covering a region of the first semiconducting portion to form a first quantum island and of a second front control gate covering a region of the second semiconducting portion forming a second quantum island, an insulating region being provided, in particular in terms of size and composition, between the first quantum island and the second quantum island and so as to enable electrostatic coupling between the first quantum island and the second quantum island,
  the quantum device being provided with a back conductive electrode disposed vertically aligned with the insulating region, said back conductive electrode being formed of a metal material-based region arranged in said semiconducting support layer of the semiconductor-on-insulator substrate.

Such an arrangement of the back electrode frees up space above the set of quantum islands, especially to be able to integrate any additional control gates thereinto.

Here, such an arrangement of the back control electrode is placed as close as possible to the active zone in order to obtain an optimised ESR coupling.

Advantageously, the metal material-based region can be formed of a met semiconductor material alloy.

Advantageously, the metal region may also be able to adopt superconducting properties. Operation at very low temperatures, in particular in the order of several milliKeivins, can thus be provided.

The metal material-based region may be based on one of the following materials: Ta, Pt, Nb, TiN, Co, V.

According to one possible implementation, the back conductive electrode is configured to carry an RF signal.

According to one particular implementation of the device, the back conductive electrode is may extend below and facing the insulating region without extending facing either of said first control gate and second control gate.

According to another aspect, the present invention relates to a method for making a device as described above.

According to another aspect, the present invention relates to a method for manufacturing a quantum device, the method comprising, in this order, steps consisting in:
  forming a plurality of gate blocks on a zone called the "active zone" of a surface layer of a semiconductor-on-insulator type substrate fitted with a semiconducting support layer and an insulating layer arranged between the support layer and said surface layer,
  forming a separation trench through said gate blocks so as to divide each gate block into a pair of front control gates, said separation trench being made extending through the active zone so as to divide the active zone into a first semiconducting portion and a second semiconducting portion, said trench also extending through the insulating layer of the substrate and having a bottom revealing a zone of the support layer,
  forming a back conductive electrode at the bottom of the trench.

Such a method:
allows very precise positioning of the back control electrode, is less invasive than a back face method, in particular one in which the back face of a substrate is structured;

avoids the need to dope the substrate very heavily to make the back electrode, remains compatible with the additional integration of exchange gates arranged above the semiconducting islands.

In particular, the back conductive electrode can be formed via the steps of:

depositing metal on said zone of the support layer revealed at the bottom of the trench, thermally treating so as to form an alloy between said metal and the semiconductor to material of the zone of the support layer.

Advantageously, the method may further comprise, after forming the gate blocks and prior to forming the back control electrode:

forming an etch stop layer on said gate blocks, the trench being made through said etch stop layer formed on the gate blocks.

According to one possible implementation, the method may further comprise, after forming the gates and prior to forming the etch stop layer, the steps of:

growing doped semiconductor material on regions of the active zone disposed on either side of the gate blocks, so as to form dopant reservoirs, siliciding an upper face of said reservoirs and gate blocks.

According to one possible implementation of the method in which prior to depositing metal to make the region of metal material-semiconductor material alloy, the method comprises steps of:

forming dielectric protection zones on side flanks of the trench, the dielectric protection zones being arranged so as to extend between the first semiconducting portion and the second semiconducting portion and to reveal the zone of the support layer at the bottom of the trench.

According to one possible embodiment, after forming the back conductive electrode, the method may comprise filling the trench by depositing at least one dielectric layer, the dielectric layer and the dielectric protection zones being of such composition and arrangement as to enable electrostatic coupling between the first semiconducting portion and the second semiconducting portion.

According to one possible implementation of the method for which said trench made extends into a given part of the substrate located at the periphery of the active zone, and wherein after depositing said at least one dielectric filling layer, the method comprises:

forming contact pads including at least one contact pad of said back control electrode, by:

forming at least one hole through the dielectric layer, said hole opening into said given part revealing the support layer, filling the hole using a conductive material.

BRIEF DESCRIPTION OF THE DRAWINGS

The present invention will be better understood upon reading the description of the examples given, purely by way of indication and in no way limiting purposes, with reference to the appended drawings in which.

Identical, similar or equivalent parts of the various figures bear the same reference numerals so as to facilitate switching from one figure to another.

The various parts represented in the figures are not necessarily drawn to a uniform scale, to make the figures more legible.

In addition, in the following description, terms that depend on the orientation of the structure such as "above", "below", "rear", "front", "peripheral" apply, considering that the structure is oriented as illustrated in the figures.

DETAILED DISCLOSURE OF PARTICULAR EMBODIMENTS

Figure 1:
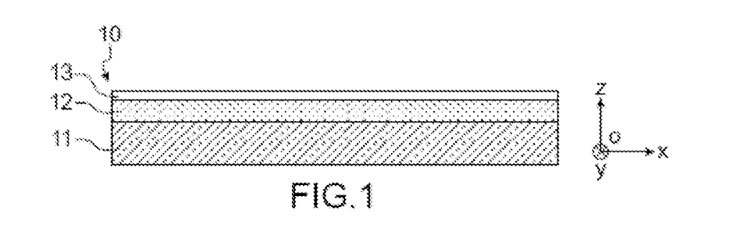
FIG. 1 illustrates a starting material for making a spin qubit device.

Reference is first made to FIG. 1, which represents a possible starting material for making a spin qubit quantum device and which is in the form of a semiconductor-on-insulator type substrate 10.

The substrate thus includes a support layer 11 of semiconductor material, a buried insulating layer 12 disposed on the support layer 11 and a semiconducting surface layer 13 disposed on the insulating layer.

The substrate is typically an SOI substrate with a surface layer 13 made of silicon, in particular $^{28}$Si when this layer is to accommodate, electron spin qubits. Other semiconductor materials can be contemplated for the semiconducting surface layer 13. In particular, when this layer is to accommodate hole spin qubits, the surface layer can be formed of $Si_{1-x}Ge_x$ with x preferably ranging between 0% and 70%.

In this case, the insulating layer 12 and the support layer 11 are typically, respectively, a layer of silicon oxide commonly called "BOX" (for "Buried Oxide") and a silicon-based layer.

The thickness of the surface layer 13, for example, is between about 5 nm and 50 nm, in typically in the order of 10 nm. The thickness of the buried insulating layer 12 is for example between 15 nm and 150 nm. Within this range a thickness close to 15 nm is preferably selected, typically in the order of 25 nm, as this layer is likely to have to be etched later. The thickness of the support layer 11 (the thicknesses being dimensions measured along the axis z of the orthogonal reference frame [O;x;y;z] given in FIG. 1) may be in the order of 775 μm, for example, if a 300 mm wafer is used.

Figure 2:
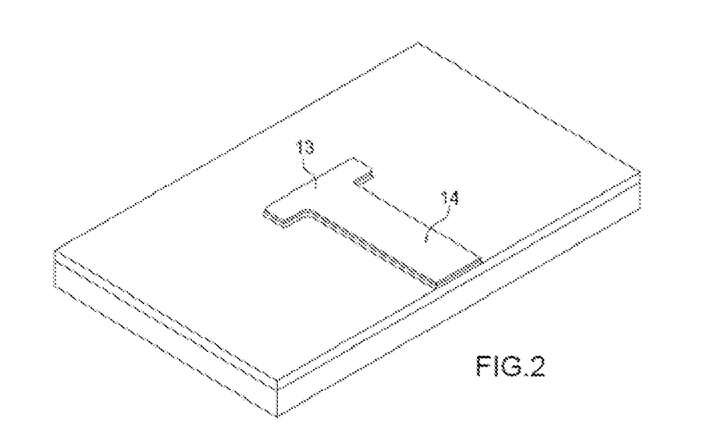
FIG. 2 illustrates an example of forming a pattern in an example of a method for manufacturing a quantum device implemented according to the invention.

Next (FIG. 2), at least one pattern of active zone 14 can be defined in the surface layer 13. This can be made by photolithography and etching of the surface layer 13, in particular plasma etching with a stop on the insulating layer 12.

Next, a gate stack is made covering the active zone 14. This stack is typically formed (FIG. 3) of a layer of gate dielectric 17 and one or more layers 18, 20 of gate semiconductor material(s) such as doped polysilicon and/or metal material(s) such as TiN, Al, or W.

Figure 3:
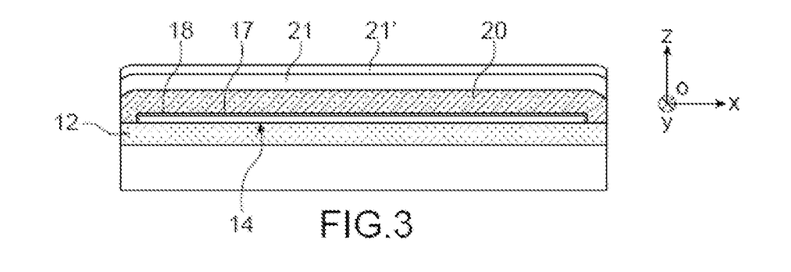
FIG. 3 illustrates a gate stack formed in an example of a method for manufacturing a quantum device implemented according to the invention.

The gate dielectric 17 may be an oxide, in particular a silicon oxide obtained by deposition or by oxidation of a surface thickness of the active zone 14. For example, the thickness of the layer of gate dielectric 17 may be in the order of 2 nm. In this case, according to one particular example of embodiment, the gate stack, in turn, may be formed of a metal layer of TiN of thickness, for example, in the order of 6 nm and a layer of polysilicon in the order of 30 nm, for example.

The gate stack may be coated with at least one masking layer, in particular one or more layers 21, 21' of hard mask typically formed by insulating layers, for example of SiN and/or $SiO_2$. In the illustrated example of embodiment, a stack is made to form this masking, in particular a two-layer stack, with a layer 21 of SiN with a thickness of, for example, between 20 nm and 30 nm coated with a layer 21' of silicon oxide with a thickness of, for example, between 20 nm and 30 nm.

A plurality of masking blocks 24a, 24c, 24d, 24e are then defined by etching in order to make a plurality of distinct gate blocks 22a, 22b, 22c, 22d, 22e. Anisotropic etching, in particular using a plasma, is carried out to make the masking blocks 24a, 24b, 24c, 24d, 24e, and then the distinct gate blocks 22a, . . . , 22e below them, repeating the patterns of the latter.

Figure 4A:
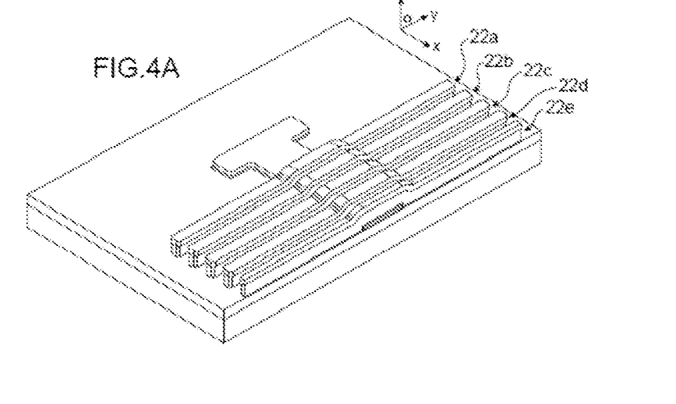
FIG. 4A is a perspective view of forming gate blocks in an example of a method for manufacturing a quantum device implemented according to the invention.
Figure 4B:
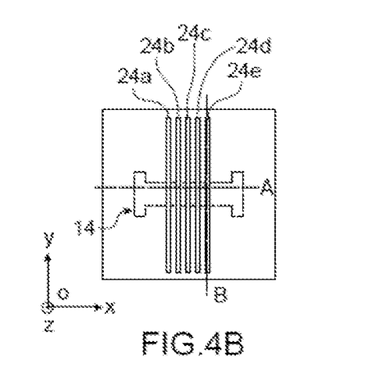
FIG. 4B is a top view of forming gate blocks in an example of a method for manufacturing a quantum device implemented according to the invention.
Figure 4C:
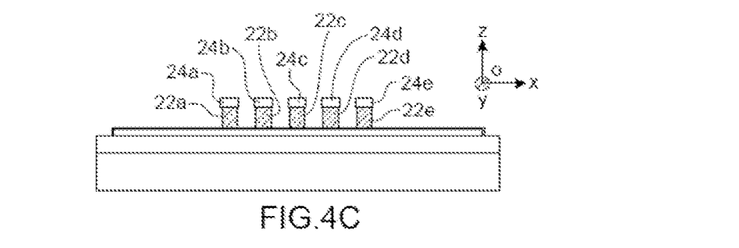
FIG. 4C is a cross-sectional view along axis A in FIG. 4B of forming gate blocks in an example of a method for manufacturing a quantum device implemented according to the invention.
Figure 4D:
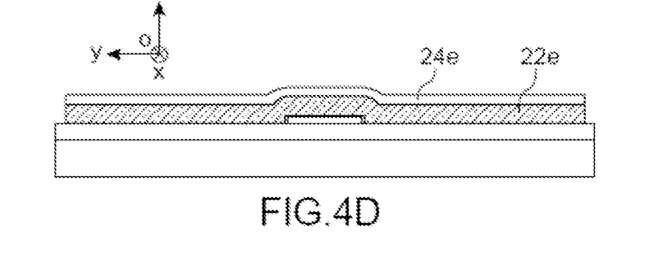
FIG. 4D is a cross-sectional view along axis B in FIG. 4B of forming gate blocks in an example of a method for manufacturing a quantum device implemented according to the invention.

A structure obtained at the end of this step is illustrated in FIGS. 4A, 4B, 4C, 4D, to respectively showing a perspective view, a top view, a cross-sectional view along a longitudinal axis A which extends in the length direction of the active zone (dimension measured parallel to the axis x of the orthogonal reference frame [O; x; y; z] in FIG. 4C), and another cross-sectional view along a longitudinal axis B that extends in the width direction of the active zone (dimension measured parallel to the axis y of the orthogonal is reference frame [O; x; y; z] in FIG. 4D).

In this example, the gate blocks 22a, . . . , 22e have a parallelepipedic bar shape. These bars typically extend in a direction orthogonal to that in which the active zone 14 extends, in other words in the width direction of the active zone 14. The gate blocks 22a, . . . , 22e are preferably evenly spaced with a dense distribution, for example such that the distribution pitch is in the order of 100 nm.

Figure 5A:
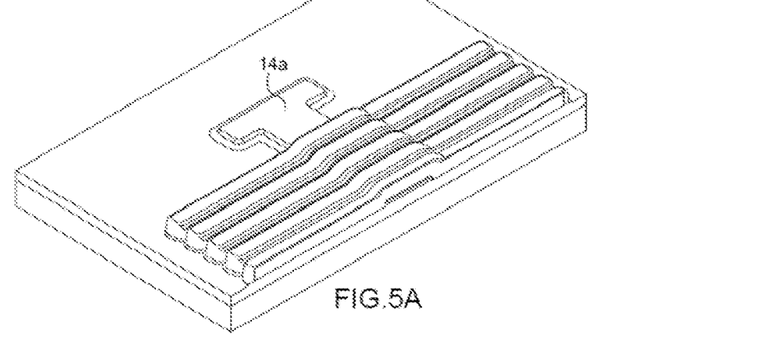
FIG. 5A is a perspective view of a step in an example of a method for manufacturing a quantum device implemented according to the invention.
Figure 5B:
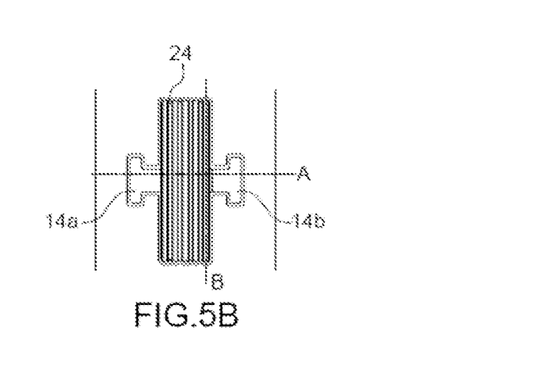
FIG. 5B is a top view of a step in an example of a method for manufacturing a quantum device implemented according to the invention.
Figure 5C:
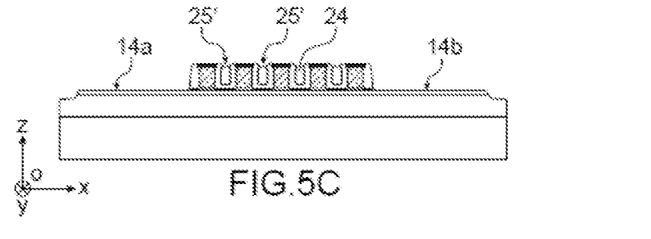
FIG. 5C is a cross-sectional view along axis A in FIG. 5B of a step in an example of a method for manufacturing a quantum device implemented according to the invention.

Insulating spacers 23, 25 may then be formed on either side of each of the gate blocks. The spacers 25, 25' can be made by depositing a dielectric layer 24, carried out to fill inter-gate gaps. The insulating material of the spacers is typically selected from one of the following materials: SIN, SiCO, SiBCN. The deposition method is preferably conformal, and in particular of the ALD (Atomic Layer Deposition) type in order to fill the inter-gate cavities without creating a filling defect. According to one particular example of embodiment, the deposited dielectric layer 24 has a thickness in the order of 30 nm. In the example of embodiment illustrated in FIGS. 5A, 5B, 5C, (showing respectively a perspective view, a top view, a cross-sectional view along a longitudinal axis A), this dielectric layer 24 is then etched so as to remove this layer from the regions 14a, 14b of the active zone.

Figure 6:
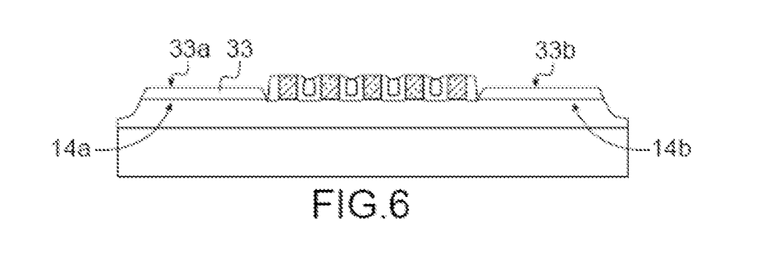
FIG. 6 illustrates forming dopant reservoirs in an example of a method for manufacturing a quantum device implemented according to the invention.

To complete the formation of dopant reservoirs 33a, 33b on these regions 14a, 14b and to increase their thickness, one or more layers of semiconductor material(s) 33 can then be grown on the revealed regions 14a, 14b of the active zone (FIG. 6). This can be carried out by silicon epitaxial growth or via CVD (chemical vapour deposition) of Germanium for example. Doping can then be carried out by ion implantation or by in situ doping carried out concurrently with the growth of the layer(s) of semiconductor material(s) 33, for example to form Si:P (phosphorus-doped silicon) or SiGe:B (boron-doped silicon Germanium).

In order to reduce the contact resistance of the dopant reservoirs 33a, 33b and/or the gate blocks 22a, . . . , 22e when at least a part of these blocks is made of doped semiconductor material, metal material-based zones can then be formed on these reservoirs and/or gate blocks.

For this, the masking blocks 24a, . . . , 24e arranged on the gate blocks are removed so as to reveal the upper face of the latter.

Such removal can be achieved by means of a selective chemical etching method. For example, etching using $H_3PO_4$ at a temperature in the order of 100° C. and for a duration of one hour can be implemented when the masking portion removed is made of SiN. The etch time can be in the order of 30 minutes, for a layer of SiN in the order of 20 nm deposited by PECVD.

Regions of metal-semiconductor alloy can then be formed. Thus, in the example of embodiment illustrated in FIG. 7, such regions 45, 46 are formed respectively on an upper face of the gate blocks as well as on an upper face of the dopant reservoirs 33a, 33b. For this, a siliciding method comprising a step of depositing at least one layer of metal, such as for example Ni, Pt, W, Co, Ti, or V can be performed. The layer of metal may optionally be covered with an encapsulation layer which may be of metal. An example of encapsulation is formed by depositing TiN, with a thickness, for example, in the order of 10 nm.

Figure 7:
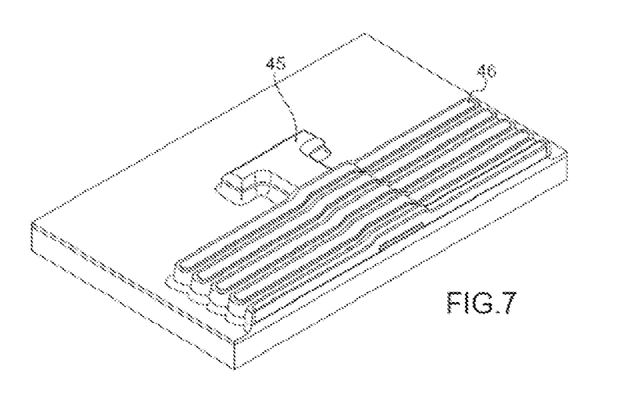
FIG. 7 illustrates forming alloy regions in an example of a method for manufacturing a quantum device implemented according to the invention.

A thermal treatment is carried out to achieve siliciding. Such a treatment can be implemented at a temperature of between 200° C. and 900° C. and for a duration adapted to the treatment temperature.

The unreacted metal can then be removed, for example by wet etching using a hot SPM (Sulphuric Peroxide Mix) solution. A second siliciding annealing can also be carried out.

In the example of embodiment illustrated in FIG. 7, regions 45, 46 of metal-semiconductor alloy, in particular silicide, are thus formed on the gate blocks and dopant reservoirs respectively. For example, the thickness of the silicified regions 45, 46 can be in the order of 15 nm.

One feature of this method is that it provides a step of cutting the active zone 14 into separate and disjointed portions after forming the gate blocks. Such a cut is typically made by etching through an opening made in at least one masking element.

Figure 8:
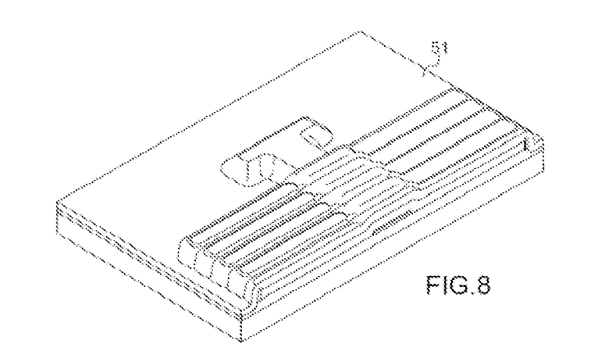
FIG. 8 illustrates forming an etch stop layer in an example of a method for manufacturing a quantum device implemented according to the invention.

Thus, in the example illustrated in FIG. 8, an etch stop layer 51 is first formed.

The etch stop layer 51 may be a CESL (Contact Etch Stop Layer), typically made of silicon nitride or a derivative material. Here, the etch stop layer can be made with a thickness, for example, in the order of 30 nm. A PECVD ("Plasma Enhanced Chemical Vapour Deposition") method can be used, for example, to deposit such a stop layer 51.

Figure 9:
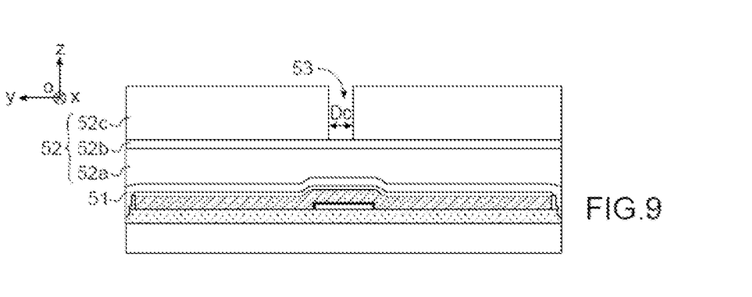
FIG. 9 illustrates forming a mask in an example of a method for manufacturing a quantum device implemented according to the invention.

A mask 52 provided with a slot 53 is then formed, which extends mainly in the length direction of the active zone (dimension measured parallel to the axis x of the reference frame [O; x; y; z] shown in FIG. 9 and which is parallel to the section plane axis A). The slot 53 extends facing the active zone 14 and also facing a region of the substrate beyond the active zone 14 and in which the semiconducting surface layer has been removed. The mask 52 may be formed of several stacked layers.

In the particular example of embodiment illustrated in FIG. 9, the mask 52 includes a three-layer, with a first layer 52a forming an organic hard mask for example a layer of spin-on-carbon ("SOC"), topped by a second anti-reflective layer 52b, for example a silicon anti-reflective layer (SiARC), and a third layer 52c which may in particular be a layer of photoresist. By way of example, a slot 53 may be provided in the mask 52 with a critical dimension Dc (smallest dimension of a pattern apart from its thickness and which is measured parallel to the plane [O; x; y]) in the order of 50 nm.

Figure 10A:
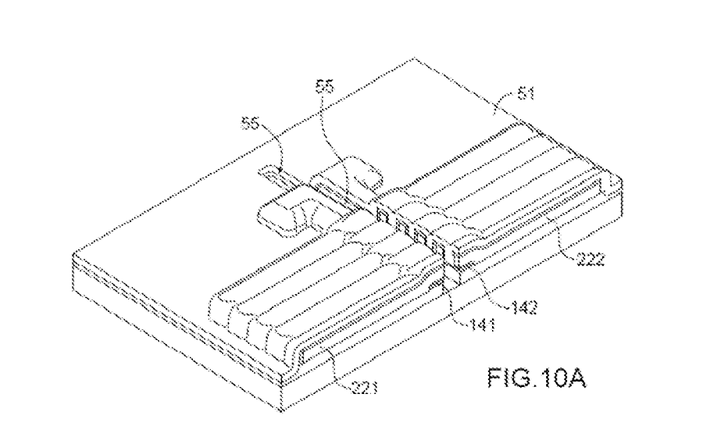
FIG. 10A is a perspective view of forming a trench in an example of a method for manufacturing a quantum device implemented according to the invention.
Figure 10B:
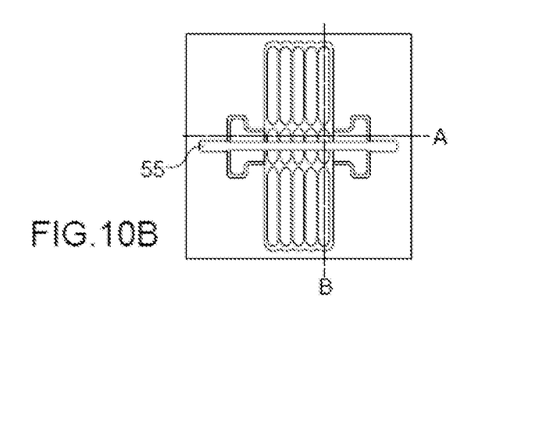
FIG. 10B is a top view of forming a trench in an example of a method for manufacturing a quantum device implemented according to the invention.
Figure 10C:
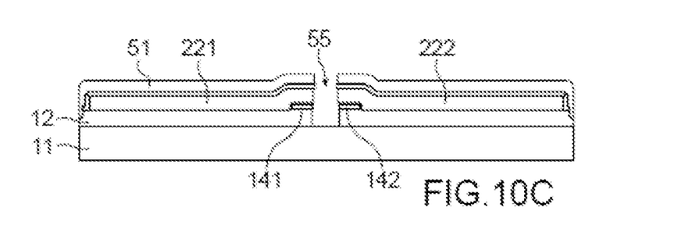
FIG. 10C is a cross-sectional along axis B in FIG. 10B of forming a trench in an example of a method for manufacturing a quantum device implemented according to the invention.

Then, as an extension of the slot 53, a trench 55 is formed in order to cut the gate blocks into two parts (FIGS. 10A, 108, 10C showing respectively a perspective view, a top view, and a cross-sectional view parallel to the axis B). The trench 55 typically repeats the pattern of the slot 53.

The division of the gate blocks into two parts makes it possible to make a first set of gates 221 covering the first semiconducting portion 141 and a second set of gates 222 covering the second semiconducting portion 142, each of the gates of the first set being arranged opposite and forming a pair with a gate of the second set.

This trench 55 is extended into the active zone 14 in order to cut the active zone 14 into two portions 141, 142. The trench 55 is made to include a bottom revealing the support layer 11 of the semiconductor-on-insulator substrate. The trench 55 extends facing the active zone 14 and includes a portion which extends beyond the active zone 14 such that this part of the trench 55 is formed through a region of the substrate in which the semiconducting surface layer 13 is removed.

Making the trench 55 may be implemented by means of anisotropic etching, typically using a plasma. Thus, the stop layer 51, all the materials forming the gate stack, the active zone 14 provided in a part of the surface layer 13 of the substrate and the insulating layer 12 of the substrate, typically of the BOX type, are etched sequentially. The etching stops at the support layer 11 of the semiconductor-on-insulator substrate, for example at the upper face of this semiconducting support layer 11.

Such a trench 55 provides access to the support layer 11 in order to make a back control electrode at the support layer 11 and in particular at least partially in the support layer 11. As indicated above, such a trench 55 also allows the active zone 14 to be separated into two distinct portions 141, 142, whereby a first portion 141 of the active zone 14 may be used as a region in which the Qubits are located, while the second portion 142 of the active zone 14 may form a load detection region. The trench may extend into a part of the substrate located at the periphery of the active zone 14 in order to, for the purpose of later making contact, provide access to the support layer 10 in a part outside the active zone 14.

Figure 11:
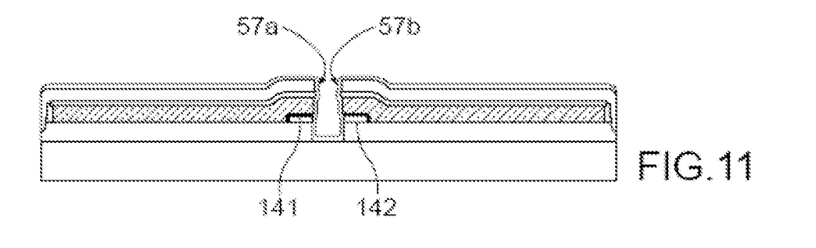
FIG. 11 illustrates forming protection zones in an example of a method for manufacturing a quantum device implemented according to the invention.

According to one particular embodiment, prior to forming a back control electrode by depositing at least one metal layer in the trench 153, protection zones 57a, 57b can be made against lateral flanks of the trench 153 (FIG. 11). The protection zones 57a, 57b are thus arranged to cover regions of the portions 141, 142 of the active zone 104 revealed by making the trench 55. The protection zones 57a, 57b are advantageously made of a dielectric material such as, for example, SiN, SiBCN, $SiO_2$, $HfO_2$, $Al_2O_3$ or SiCO.

In particular, the dielectric material of these zones 57a, 57b and their thickness may be selected depending on a level of electrostatic cut-off that it is desired to establish between the two portions 141, 142 separated from each other by the trench 55. For in example, the deposited dielectric material may have a thickness of between 5 and 15 nm.

Figure 12:
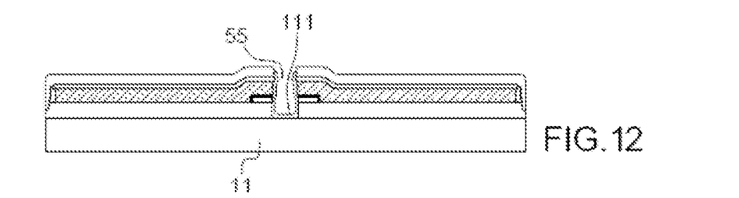
FIG. 12 illustrates etching in an example of a method for manufacturing a quantum device implemented according to the invention.

A typically dielectric protective material is thus deposited to fit closely to the flanks of the trench 55. This protective material is then removed by anisotropic etching (FIG. 12), typically via a plasma, to remove it from the bottom of the trench 55. A zone 111 of the semiconducting support layer 11 is thus revealed again at the bottom of the trench 55.

The back control electrode is then formed by first depositing metal material. Preferably, the back control electrode is made by forming a metal-semiconductor alloy or compound at the bottom of the trench 55. This is typically carried out by siliciding, with a method which may be similar to that described previously in connection with FIG. 7 in order to form contact zones on the gate blocks and dopant reservoirs.

Thus, a step of depositing at least one layer of metal, such as for example Ni, Pt, W, Co, Ti, or V can be performed first. A thermal treatment is then carried out. Such a treatment can be carried out at a temperature of between 200° C. and 900° C. and a duration adapted according to the treatment temperature. For example, for a temperature in the order of 250° C., a duration in the order of 30 s can be provided.

Figure 13:
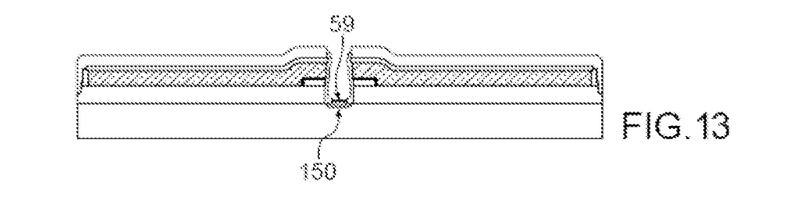
FIG. 13 illustrates forming a back gate in an example of a method for manufacturing a quantum device implemented according to the invention.

A selective siliciding method can be used, so that silicide is formed only where the semiconductor material of the support layer 11 is revealed or bared. The thickness of the silicided layer may be, for example, in the order of 15 nm or more. This layer 59 of silicide is used to form a back gate which is a metal gate and therefore not based on a doped semiconductor material (FIG. 13).

Figure 14:
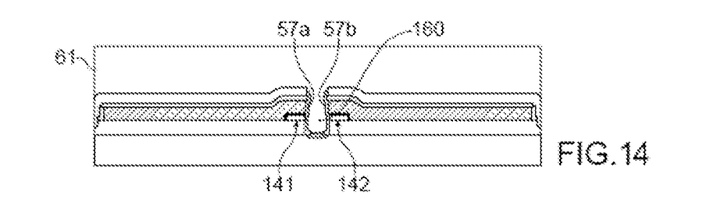
FIG. 14 illustrates filling the trench and planarisation in an example of a method for manufacturing a quantum device implemented according to the invention.
Figure 15A:
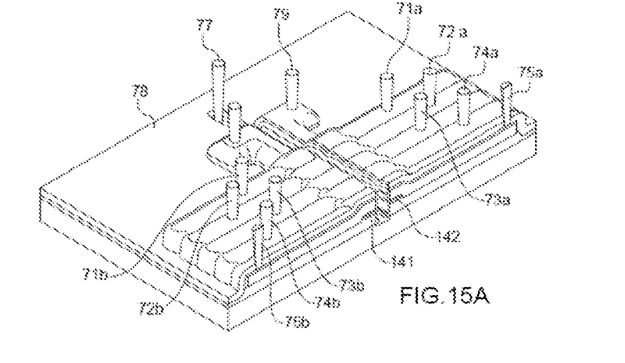
FIG. 15A is a perspective view of forming contacts in an example of a method for manufacturing a quantum device implemented according to the invention.
Figure 15B:
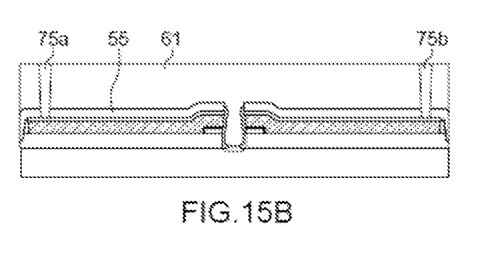
FIG. 15B is a cross-sectional view of forming contacts in an example of a method for manufacturing a quantum device implemented according to the invention.

The trench 55 (FIG. 14) is then filled with one or more dielectric materials. For this, one or more successive deposits of dielectric material(s) are carried out, followed by a CMP (Chemical Mechanical Polishing) planarisation. Again, the dielectric filling material(s) can be selected for their permittivity, depending on a desired level of electrostatic coupling between the two portions 141, 142 of the active zone 14 which are disjointed and separated from each other by the trench 55. For example, the filling is carried out with a PMD (pre-metal dielectric) type dielectric 61 such as silicon oxide. A conformal filling of the trench 55 can be implemented, for example, by performing FCVD (Furnace Chemical Vapor Deposition) and HDP (High Density Plasma) deposition of TEOS type silicon oxide. Then (FIGS. 15A and 15B showing respectively a perspective view and a cross-section view parallel to the axis B), contact pads are formed, in particular contact pads 71a, 72a, 73a, 74a, 75a are formed on first gate blocks which are located on one side of the trench and cover the first part 141 of the active zone 14, and contact pads 71b, 72b, 73b, 74b, 75b are formed on second gate blocks which are located on another side of the trench 55, is cover the second part 142 of the active zone 103a and are disjointed from the first gate blocks.

Contact pads 78, 79 are also provided on the portions of the dopant reservoirs. Similarly, typically at least one contact pad 77 is provided on the back control electrode.

The contact pads can be made by forming holes passing through the dielectric layer 61 and the etch stop layer 53, for example by photolithography and then plasma etching.

The holes are then filled with a metal such as W for example. In order to make FIG. 15A more readable, the dielectric material 61 filling the trench and covering the structure here is not represented.

Among these holes, typically, a hole is typically made passing through the trench 55 and opening into a given part that reveals the support layer. Once this hole is filled with conductive material, a contact pad is thus formed for making contact with the back electrode 150.

Figure 16A:
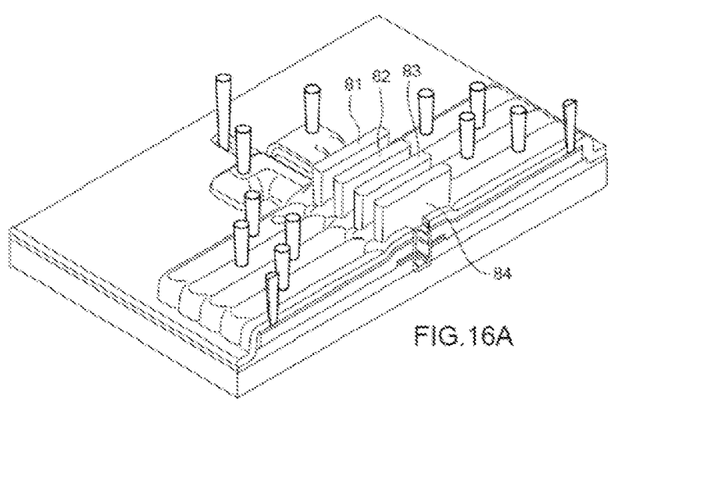
FIG. 16A illustrates forming additional electrodes in an example of a method for manufacturing a quantum device implemented according to the invention.
Figure 16B:
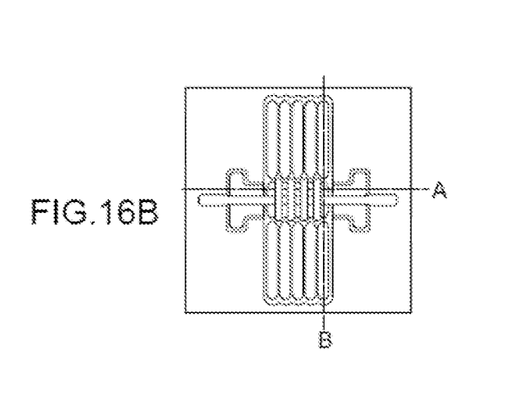
FIG. 16B illustrates forming additional electrodes in an example of a method for manufacturing a quantum device implemented according to the invention.
Figure 16C:
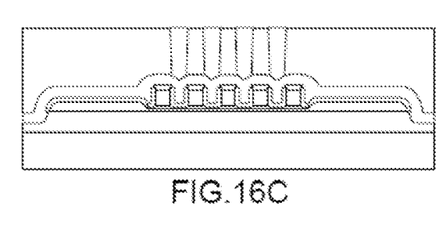
FIG. 16C illustrates forming additional electrodes in an example of a method for manufacturing a quantum device implemented according to the invention.

According to one possible implementation (FIGS. 16A, 16B, 16C), the making of this structure can be completed by forming additional electrodes 81, 82, 83, 84 called exchange gates which extend above the semiconducting portions 141, 142, in a direction parallel to that of the blocks. These electrodes make it possible to modulate the potential barriers between two successive quantum islands. They therefore modulate the coupling between the islands and thus allow control of the exchange energy of the quantum islands, in order to make FIG. 16A more readable, the dielectric material 161 filling the trench and covering the structure here is, again, not represented.

Figure 17:
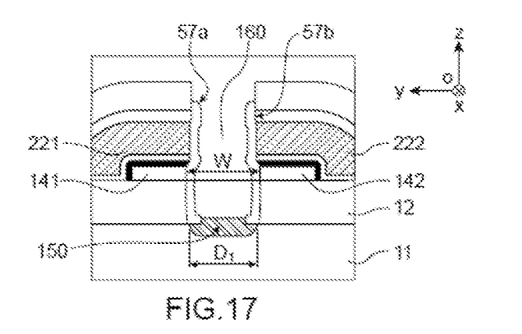
FIG. 17 illustrates an example of a quantum device implemented according to the invention.

In FIG. 17, a cross-sectional view of a spin qubit quantum device, and which may have been made using a method as described above, is shown.

The device includes a first semiconducting portion 141 in which a row of quantum islands is provided and a second semiconducting portion 142, juxtaposed to the first semiconducting portion, and in which a further row of quantum islands is made. The semiconducting portions 141, 142 have blocks of oblong, for example parallelepipedic, shape in which quantum islands are arranged and separated in twos by a tunnel barrier.

At the ends of these blocks dopant reservoirs are typically provided. In the cross-sectional view of FIG. 17, only those blocks which extend in a direction orthogonal to the plane of is the figure are represented.

The islands of the first portion 141 are provided to form a first row of data qubits, while the islands of the second portion 142 form a second row of detection elements for reading a coded value from the data qubits of the first row.

Above each island of the first row, a front control gate 221 is arranged, and facing this gate 221, above each island of the second row of detection islands, a control gate 222 is provided.

The semiconducting portions 141, 142 are separated from each other via an insulating region 160. The dielectric constant of this region 160, which depends on its composition in dielectric materials), and its dimensioning, in particular the width W (dimension measured parallel to the axis y of the orthogonal reference frame [O;x;y;z]) between the portions 141, 142, are provided between the first quantum island 141 and the second quantum island 142, so as to allow an electrostatic coupling between these islands 141, 142. The coupling is such that the current in the load detector is likely to vary typically by a factor of 10 depending on the occupancy of the quantum island.

In the illustrated example of embodiment, the insulating region 160 is comprised of dielectric zones 57a, 57b disposed respectively against the first semiconducting portion 141 and against the second semiconducting portion 142 and based on a dielectric material of dielectric constant $k_1$, for example silicon nitride, and of a dielectric layer 60 between these zones 57a, 57b. The dielectric layer 60 is made of a different material to that of the zones 57a, 57b, for example silicon oxide and of dielectric constant $k_2$ such that $k_2 \neq k_1$. Alternatively, it is possible to provide an insulating region 160 of a single dielectric material or comprised of more than two distinct dielectric materials. In order to limit a potential non-uniformity within the semiconducting portions 141, 142, advantageously a material or materials of low permittivity are provided to form the insulating region 160. The dielectric materials used to form the insulating region 160 are selected by their respective dielectric constants depending on the desired level of coupling.

Below and facing the insulating region 160, in other words, vertically aligned with this is region 160, the device is provided with an additional conductive electrode 150 which is based on a metal material, in particular a metal-semiconductor alloy such as $CoSi_2$ or $V_3Si$. This metal electrode 150 is thus advantageously made of a material likely to form a superconductor and operate at very low temperatures, in particular in the order of several milliKelvins.

For a distance separating the semiconducting portions 141, 142, for example, of between 40 and 50 nm, an effective relative permittivity of the material(s) separating these two semiconducting zones may be considered typically greater than 3.

The electrode 150 typically extends in a direction orthogonal to that of the main direction of the gate pairs 221, 222, in other words in the length direction of the semiconducting portions 141, 142. Such an electrode 150, also called "back gate", helps to control the respective spin states of the islands forming Qubits by EPR coupling (for "Electronic Paramagnetic Resonance", also called ESR for "Electron Spin Resonance"). This electrode 150 is adapted, by its composition and dimensions, to carry an RF signal, for example in the order of several GHz, in order to generate an oscillating magnetic field. In this example, since the electrode 150 is made below the insulating layer 12 of a semiconductor-on-insulator substrate, it is arranged as close as possible to the semiconducting portions 141, 142. This helps to achieve better coupling.

An insulating layer 12, typically of the thick buried oxide type, is advantageous used in order to reduce the risks of potential non-uniformity in the semiconducting portions. The insulating layer 12 can be, for example, a 25 nm thick layer of BOX.

Figure 18:
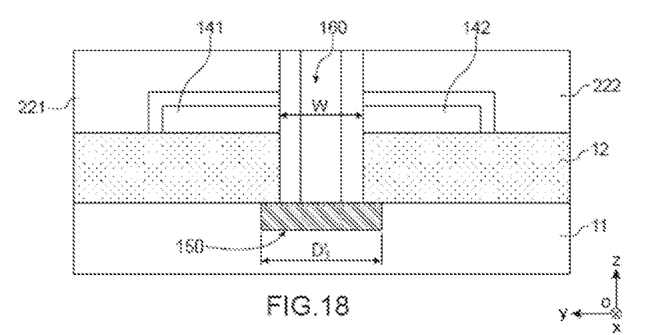
FIG. 18 illustrates an example of a quantum device implemented according to the invention.

In the example illustrated in FIG. 17, the buried electrode 150 has a width D1 (dimension measured parallel to the axis y of the orthogonal reference frame [O;x,y;z]) which substantially corresponds to that of the insulating region 160 between the semiconducting portions 141, 142. Thus, in the example illustrated in FIG. 17, the buried in electrode 150 is located vertically aligned with the region 160 located in a gap between pairs 221, 222 of gates without extending facing either of these pairs of gates. Alternatively, as in the arrangement in FIG. 18, a wider back electrode 150 may be provided so as to extend at least partially below the semiconducting portions 141, 142 without significantly impacting the functionality of the device or the back gate.

The invention claimed is:

1. A spin Qubit quantum device, comprising:
a first semiconducting portion and a second semiconducting portion juxtaposed to the first semiconducting portion, said semiconducting portions being formed in a surface layer of a semiconductor-on-insulator type substrate and disposed on an insulating layer of said semiconductor-on-insulator type substrate, the substrate being fitted with a semiconducting support layer such that said insulating layer is arranged between said support layer and said surface layer, and
several pairs of front control gates, each pair being formed respectively of a first front control gate covering a region of the first semiconducting portion to form a first quantum island and of a second front control gate covering a region of the second semiconducting portion forming a second quantum island, an insulating region being present between the first quantum island and the second quantum island and formed of one or more dielectric materials, the insulating region being configured so as to enable electrostatic coupling between the first quantum island and the second quantum island,
the quantum device being provided with a back conductive electrode disposed vertically aligned with the insulating region, said back conductive electrode being formed of a metal material-based region arranged in said semiconducting support layer of the semiconductor-on-insulator substrate.

2. The device according to claim 1, wherein the metal material-based region is formed of metal-semiconductor material alloy.

3. The device according to claim 1, wherein the metal material-based region is based on one of: Ta, Pt, Nb, TiN, Co, and V.

4. The device according to claim 1, wherein the back conductive electrode is configured to convey an RF signal.

5. The device according to claim 1, wherein the insulating region is comprised of different dielectric materials.

6. The device according to claim 1, wherein the back conductive electrode extends below and facing the insulating region without extending to face either of said first control gate and second control gate.

7. A method for manufacturing a spin Qubit quantum device according to claim 1, the method comprising, in order:
forming a plurality of gate blocks on an active zone of a surface layer of a semiconductor-on-insulator type substrate fitted with a semiconducting support layer and with an insulating layer arranged between the support layer and said surface layer,
forming a separation trench through said plurality of gate blocks so as to divide each gate block into a pair of front control gates, said separation trench extending through the active zone so as to divide the active zone into a first semiconducting portion and a second semiconducting portion, said trench also extending through the insulating layer of the substrate and having a bottom revealing a zone of the support layer, and
forming a back conductive electrode at the bottom of the trench.

8. The method according to claim 7, wherein forming the back conductive electrode comprises:
depositing metal on said zone of the support layer revealed at the bottom of the trench, and
thermally treating so as to form an alloy between said metal and the semiconductor material of the zone of the support layer.

9. The method according to claim 7, further comprising, after forming the plurality of gate blocks and prior to making the back conductive electrode:
forming an etch stop layer on the plurality of gate blocks, the trench being made through said etch stop layer formed on the plurality of gate blocks.

10. The method according to claim 9, further comprising, after forming the plurality of gate blocks and prior to forming the etch stop layer:
growing doped semiconductor material on regions of the active zone disposed on either side of the plurality of gate blocks, so as to form dopant reservoirs, and
siliciding an upper face of said reservoirs and the plurality of gate blocks.

11. The method according to claim 7, comprising, prior to depositing metal:
forming dielectric protection zones on side flanks of the trench, the dielectric protection zones being arranged so as to extend between the first semiconducting portion and the second semiconducting portion and to reveal the zone of the support layer at the bottom of the trench.

12. The method according to claim 11, comprising, after forming the back conductive electrode, filling the trench by depositing at least one dielectric layer, the at least one dielectric layer and the dielectric protection zones being of such composition and arrangement as to enable electrostatic coupling between the first semiconducting portion and the second semiconducting portion.

13. The method according to claim 12, wherein said trench extends into a given part of the substrate located at a periphery of the active zone, the method further comprising, after depositing said at least one dielectric layer:
   making contact pads including at least one contact pad of said back conductive electrode by:
      forming at least one hole through the dielectric layer, said hole opening into said given part revealing the support layer, and
      filling the at least one hole using a conductive material.

14. The device according to claim 1, wherein each pair of front control gates is separated by a separation trench, said separation trench extending between said first semiconducting portion and said second semiconducting portion, and said insulating region being situated in said separation trench.

15. The device according to claim 1, wherein the first semiconducting portion and second semiconducting portion extend parallel to a first direction, the front control gates extending parallel to a second direction, and said second direction being orthogonal to said first direction.

* * * * *